United States Patent
Bowen

(10) Patent No.: US 10,320,773 B2
(45) Date of Patent: Jun. 11, 2019

(54) VALIDATION FOR REQUESTS

(71) Applicant: Amazon Technologies, Inc., Reno, NV (US)

(72) Inventor: Peter Zachary Bowen, Bainbridge Island, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/674,412

(22) Filed: Aug. 10, 2017

(65) Prior Publication Data

US 2017/0366539 A1 Dec. 21, 2017

Related U.S. Application Data

(63) Continuation of application No. 14/821,477, filed on Aug. 7, 2015, now Pat. No. 9,769,153.

(51) Int. Cl.
*H04L 29/06* (2006.01)
*H04L 9/32* (2006.01)

(52) U.S. Cl.
CPC ......... *H04L 63/0823* (2013.01); *H04L 9/321* (2013.01); *H04L 9/3234* (2013.01); *H04L 9/3236* (2013.01); *H04L 9/3268* (2013.01)

(58) Field of Classification Search
None
See application file for complete search history.

(56) References Cited

U.S. PATENT DOCUMENTS

| | | | |
|---|---|---|---|
| 6,058,383 A | 5/2000 | Narasimhalu et al. | |
| 6,853,988 B1 | 2/2005 | Dickinson | |
| 8,327,128 B1 | 12/2012 | Prince | |
| 8,843,636 B1 | 9/2014 | Wu et al. | |
| 9,021,255 B1 * | 4/2015 | Aharoni | H04L 29/06 713/155 |
| 9,215,231 B1 | 12/2015 | Bowen | |
| 2002/0007454 A1 * | 1/2002 | Tarpenning | G06F 21/10 713/156 |
| 2002/0029248 A1 | 3/2002 | Cook | |

(Continued)

OTHER PUBLICATIONS

Requirement for Restriction/Election dated Mar. 16, 2017, issued in U.S. Appl. No. 14/821,477.

(Continued)

*Primary Examiner* — Malcolm Cribbs
(74) *Attorney, Agent, or Firm* — Hogan Lovells US LLP

(57) ABSTRACT

A customer can demonstrate control over an element, such as a domain, by receiving a certificate from a certificate authority. After receiving a request for a certificate for a certain domain name, the certificate authority uses a public key cryptography protocol to generate a request for information regarding the domain name. The request for information is submitted to a domain service which hosts that domain name, and the domain service will provide a response to the certificate authority which includes a public key and data for the domain name, with the data encrypted under an associated private key for the domain name. The certificate authority will issue a certificate specifying the domain name and utilizing the received public key, and the certificate is unable to be validated without access to the associated private key.

17 Claims, 8 Drawing Sheets

(56) References Cited

U.S. PATENT DOCUMENTS

| | | | |
|---|---|---|---|
| 2003/0126431 A1* | 7/2003 | Beattie | G06F 21/6218 |
| | | | 713/156 |
| 2005/0278547 A1 | 12/2005 | Hyndman | |
| 2006/0161644 A1* | 7/2006 | Adelman | H04L 29/12066 |
| | | | 709/222 |
| 2006/0200857 A1 | 9/2006 | Yokota | |
| 2006/0288224 A1 | 12/2006 | Won et al. | |
| 2008/0184030 A1 | 7/2008 | Kelly et al. | |
| 2008/0320566 A1 | 12/2008 | Herzog et al. | |
| 2009/0092247 A1 | 4/2009 | Kido et al. | |
| 2009/0193070 A1* | 7/2009 | Rodriguez | G06F 21/335 |
| | | | 709/203 |
| 2009/0193505 A1* | 7/2009 | Rodriguez | H04L 63/0823 |
| | | | 726/6 |
| 2009/0240941 A1 | 9/2009 | Lee | |
| 2010/0325723 A1 | 12/2010 | Essawi | |
| 2012/0072723 A1 | 3/2012 | Orsini et al. | |
| 2012/0173873 A1 | 7/2012 | Bell et al. | |
| 2012/0216035 A1 | 8/2012 | Leggette et al. | |
| 2012/0254960 A1 | 10/2012 | Lortz et al. | |
| 2013/0117560 A1 | 5/2013 | Resch et al. | |
| 2013/0132721 A1 | 5/2013 | Busser et al. | |
| 2013/0218779 A1 | 8/2013 | Kirillin et al. | |
| 2014/0122242 A1 | 5/2014 | Stephenson et al. | |
| 2014/0149735 A1 | 5/2014 | Tenenboym et al. | |
| 2014/0181504 A1 | 6/2014 | Aimahallawy | |
| 2014/0283106 A1 | 9/2014 | Stahura | |
| 2014/0373097 A1* | 12/2014 | Thayer | H04L 63/0823 |
| | | | 726/4 |
| 2014/0373127 A1* | 12/2014 | Thayer | H04L 63/10 |
| | | | 726/10 |
| 2015/0244707 A1* | 8/2015 | Bowen | H04L 63/0823 |
| | | | 713/158 |
| 2015/0341342 A1* | 11/2015 | Klieman | H04L 63/0823 |
| | | | 713/158 |
| 2016/0110706 A1* | 4/2016 | Li | G06K 19/077 |
| | | | 705/44 |
| 2016/0330164 A1* | 11/2016 | Bellan | H04L 51/36 |

OTHER PUBLICATIONS

Notice of Allowance dated May 23, 2017, issued in U.S. Appl. No. 14/821,477.

U.S. Non-Final Office Action dated Nov. 30, 2017 issued in U.S. Appl. No. 15/674,408.

U.S. Final Office Action dated Jun. 7, 2018 issued in U.S. Appl. No. 15/674,408.

U.S. Notice of Allowance dated Nov. 1, 2018 issued in U.S. Appl. No. 15/674,408.

* cited by examiner

VALIDATION FOR REQUESTS

CROSS-REFERENCES TO RELATED APPLICATIONS

This application is a continuation of allowed U.S. application Ser. No. 14/821,477, entitled "VALIDATION FOR REQUESTS," filed Aug. 7, 2015; of which the full disclosure of this application is incorporated herein by reference for all purposes.

BACKGROUND

Users are increasingly performing tasks using remote computing resources, often referred to as part of "the cloud." This has many advantages, as users do not have to purchase and maintain dedicated hardware and software, and instead can pay for only those resources that are needed at any given time, where those resources typically will be managed by a resource or "cloud" provider. It will often be the case that a user will want one or more cloud resources to perform actions on behalf of the user. At least some of these actions may require some verification that the resource is authorized to perform such a task or action on behalf of the user and/or that the user is authorized to perform such a task or action. For example, a user might want messages sent that are associated with a particular email address, or actions performed with respect to a particular domain name. There is currently no standardized way for the cloud resources to verify that the user is associated with the corresponding domains or addresses, and authorized to have actions performed for them.

BRIEF DESCRIPTION OF THE DRAWINGS

Various embodiments in accordance with the present disclosure will be described with reference to the drawings, in which.

DETAILED DESCRIPTION

Figure 1:
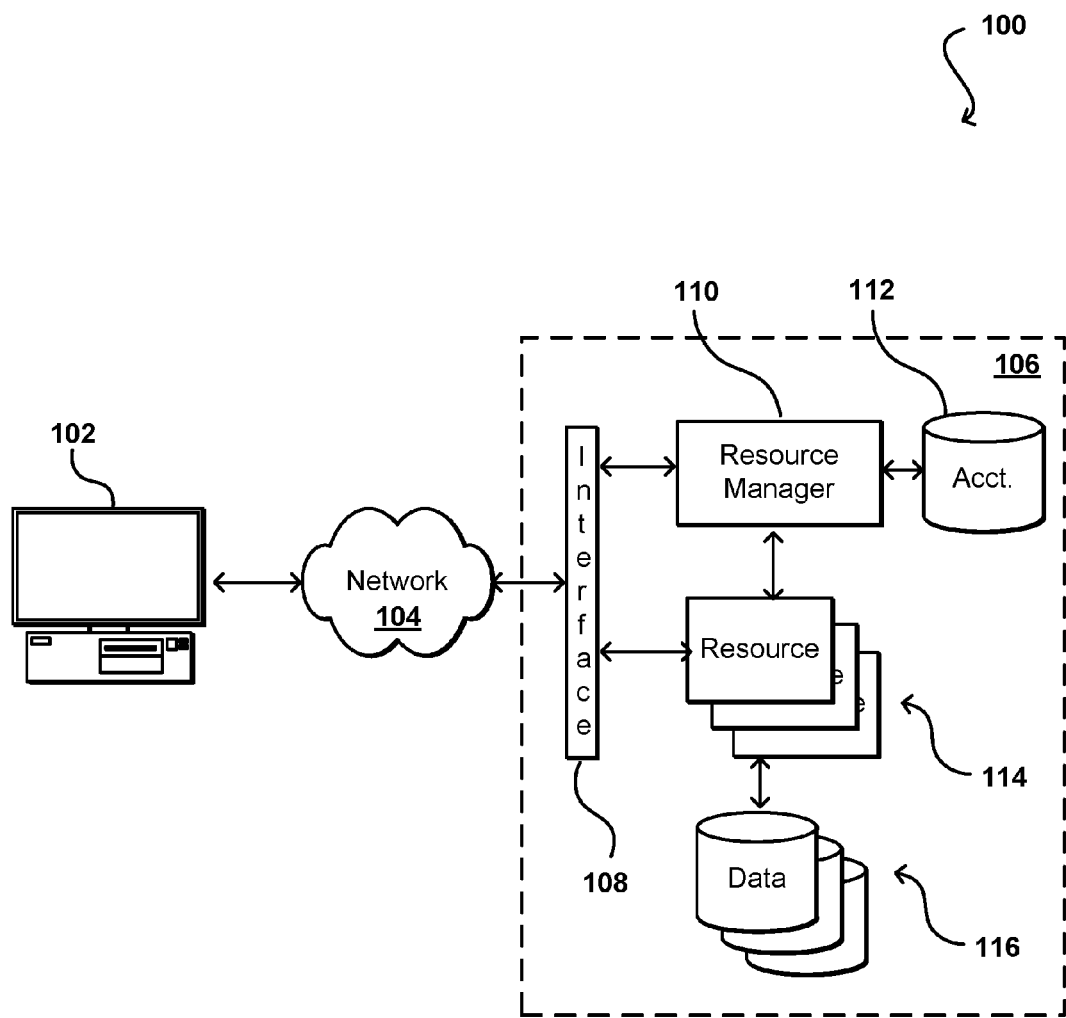
FIG. 1 illustrates an example environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to ways to verify control over elements such as domains in an electronic environment. In at least some embodiments, a customer can submit a request (or have a request submitted to) a service provider to have one or more specific actions taken by the service provider. This can include, for example, applying for a certificate from a provider such as a certificate authority to attempt to obtain verification for information such as the identity of the customer, the relationship of the customer with a certain element or component (such as a domain name or email address), and/or the ability to use, access, or modify that element or component. In some embodiments, a customer can submit a request for a certificate to a certificate authority, and can receive back a request token, such as a request key. The customer can generate a cryptographic hash of the request using the request token, which then can be transmitted to the certificate authority for comparison against a similar hash generated by the certificate authority. If the hashes match, the certificate can be issued (or other action taken). A customer can also have the option of requesting one or more request tokens up front, without providing any additional information, and can then use these tokens at the appropriate time(s) to submit requests for specific actions where the requests include the appropriately generated hashes. Such an approach enables a customer to obtain multiple tokens before they are needed, in order to reduce the amount of time and effort when an action is to be taken. Further, the customer can provide the request tokens to users or other parties as appropriate.

In some embodiments a customer can submit a request specifying one or more domains, and a certificate authority (or other such service provider) can determine a list of email addresses that can be used to confirm control over those domains, which can be provided to the customer. The certificate authority can receive selection of one of those addresses, and can generate a message to be sent to that address that includes a link for requesting a certificate. If an application for a certificate is subsequently received using that link the certificate can be issued. In other embodiments a request token generated in response to a certificate request can be sent to a customer to provide to a registry for a domain associated with the request. The certificate authority can then submit a request to the registry to obtain the request token, and if the request token is received then the certificate can be issued. In still other embodiments a request for a certificate can be received at a certificate authority, which can submit a request to the corresponding domain using a determined key-based protocol. A response can be received with the public key for the domain and data signed with the private key. A certificate can then be issued containing the requested domain name and the received public key. Although such a certificate can be issued without first obtaining identification verification as in other embodiments, the certificate issued in this embodiment will not be of any use to a person or entity not having access to the corresponding private key.

Various other such functions can be used as well within the scope of the various embodiments as would be apparent to one of ordinary skill in the art in light of the teachings and suggestions contained herein.

FIG. 1 illustrates an example environment 100 in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received at an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received at the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

As mentioned, there will be instances where a customer of a resource environment will want the resources of the environment to take actions on behalf of the customer. This may involve tasks where the customer has to verify information such as the identity of the customer, the relationship of the customer with a certain element or component (such as a domain or email address), and/or the ability to use, access, or modify that element or component. For example, a customer might want messages sent that indicate that they come from a particular email address and/or domain, such as "bob@example.com." The customer might also, or alternatively, want to set up such an address. In order to be able to perform such a task, a rule or policy of the resource environment might first require some sort of verification that the customer has the authority and/or permission to utilize that address. This can include, for example, that the email address is associated with the customer or the customer owns the domain of the email address, among other such options. In some instances shared Web hosting or privacy services might result in a "proxy" being listed as the owner of the domain, even though the customer controls the use of that domain. In such cases it can be necessary for the owner to demonstrate such control before being able to have various tasks performed with respect to the domain.

Figure 2:
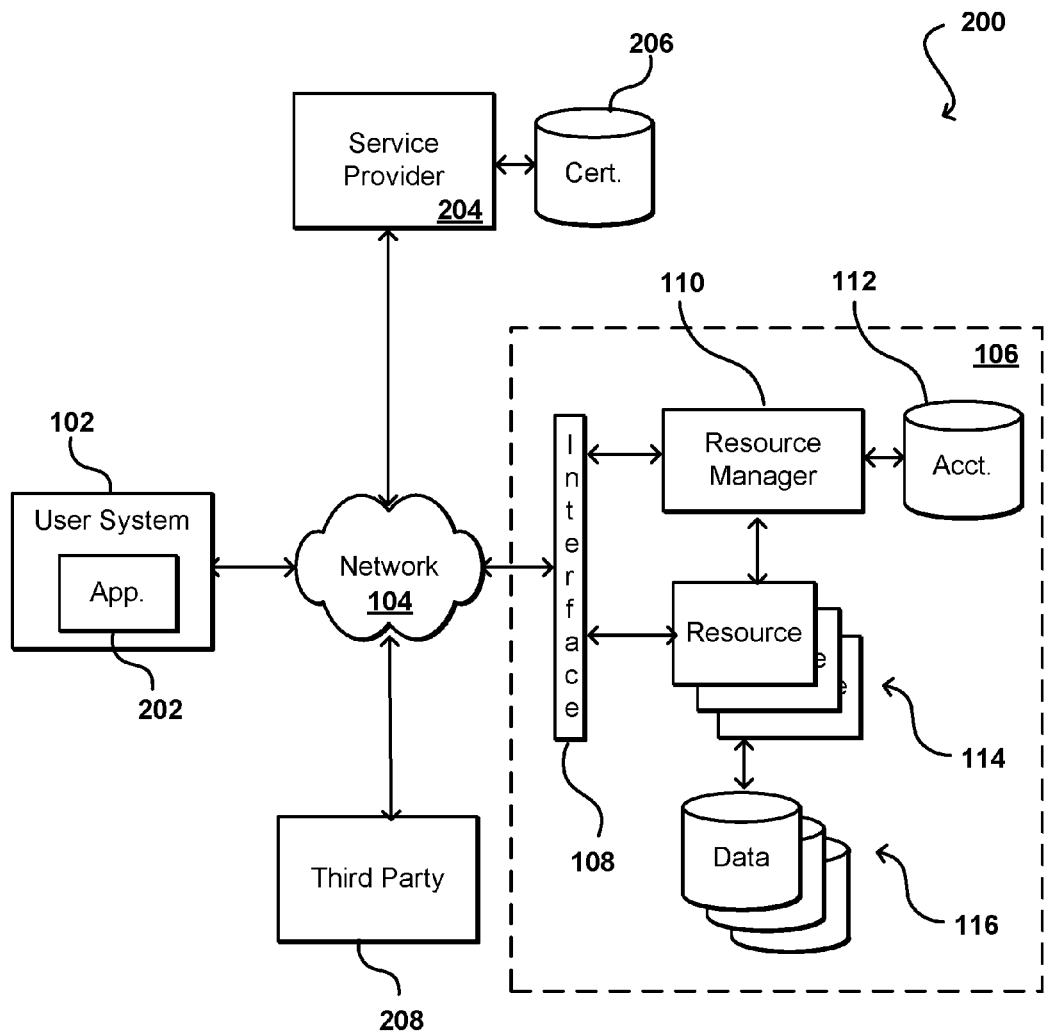
FIG. 2 illustrates an example environment wherein a user can have an action performed by a service provider, such as to obtain a certificate from a certificate authority for performing various tasks, that can be utilized in accordance with various embodiments.

Approaches in accordance with various embodiments provide mechanisms for users or customers to demonstrate ownership, association, or control of various elements in order to perform various tasks in an electronic environment. In at least some embodiments, a service provider such as a certificate authority (CA) can take an appropriate action, such as to provide a certificate or other information useful for verifying the identity of the user and generating information capable of verifying control over certain elements, setting up and/or initializing an email address, validating an alias, and the like. As illustrated in the example situation 200 of FIG. 2, a user might be running an application 202 on a user system that wants to perform a task, for example, requiring proof of control. It should be noted that reference numbers are carried over between figures for similar elements for purposes of simplicity of explanation, but that such usage should not be interpreted as a limitation on the scope of the various embodiments unless otherwise specifically stated. In this example, the application 202 may send a request across the at least one network 104 to the resource provider environment 106 to have a resource 114 of the environment perform a specific task. Since the task requires verification of control, the user system 102 can contact a service provider 204, such as a certificate authority, to issue a certificate, or other such information, useful for providing such verification. The service provider can be any appropriate entity or authority known or used for such purposes, as may store information, credentials, issued certificates, and other information in a local data store 206 or other such repository. A certificate authority in general is a trusted provider that performs identity validation and other related tasks. As will be discussed later herein, such identifying information can be provided to verify control of the element, which can enable the resource environment 106 to perform various tasks, such as to send an email to a third party system 208 that is associated with a particular domain, or to set up an email account at that domain for the third party system 208, among other such options. A certificate from a certificate authority, or other such information from a service provider, can be sufficient to verify identity, but may not be sufficient to verify control in at least some situations.

Figure 3:
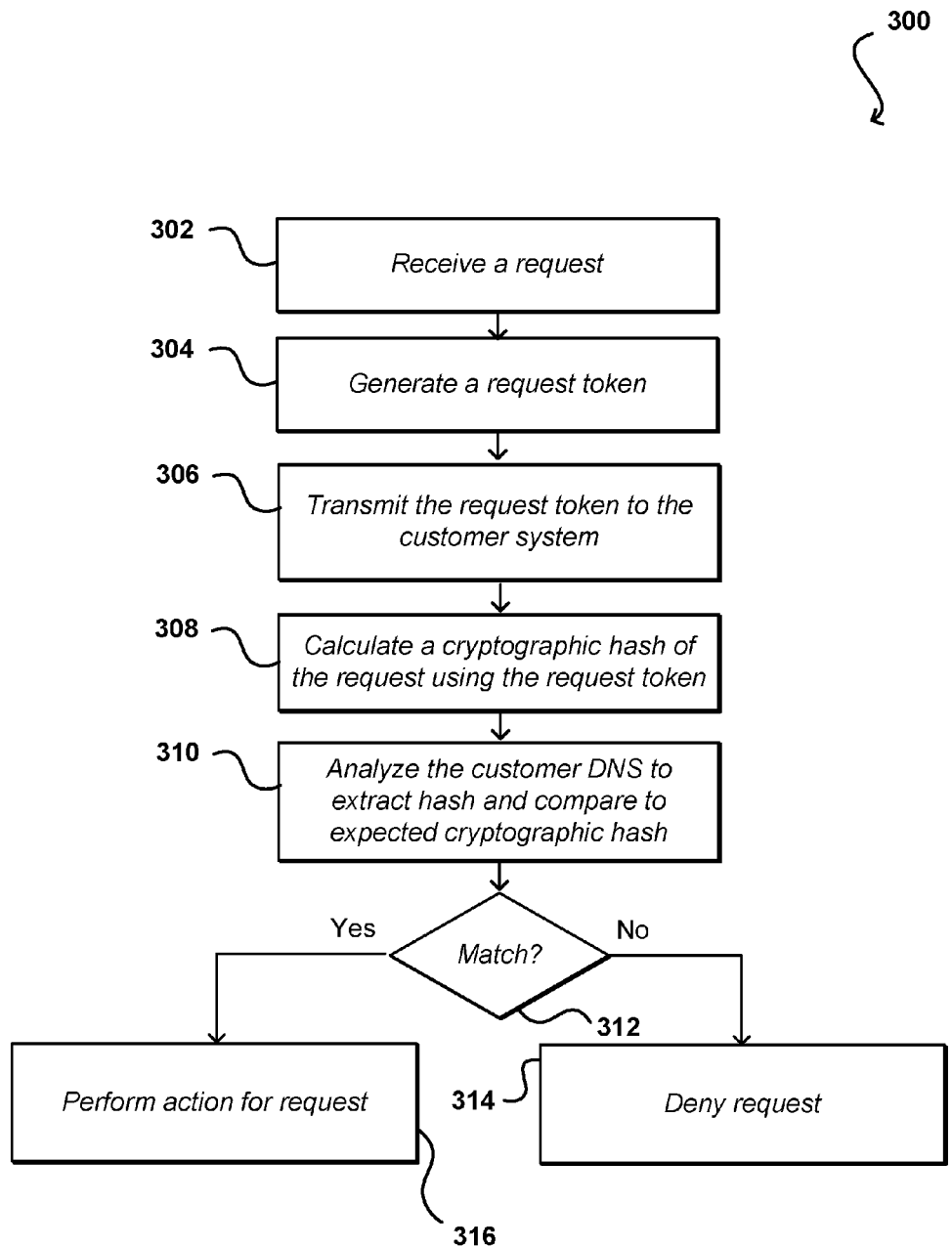
FIG. 3 illustrates a first example process for having an action performed in response to a request that can be utilized in accordance with various embodiments.

Accordingly, approaches in accordance with various embodiments attempt to leverage the certificate information to generate verification information that can be used to prove control (or at least authorization to perform various tasks) over various elements, systems, domains, services, or other such components. FIG. 3 illustrates an example process for demonstrating authorization that can be utilized in accordance with various embodiments. It should be understood that for this and other processes discussed herein that additional, fewer, or alternative steps can be performed in similar or alternative steps, or in parallel, within the scope of the various embodiments unless otherwise stated. In this example, a customer of a resource provider environment wants to have a task performed that requires verification of authorization to have a task performed with respect to a domain. A certificate authority (CA), or other such service provider, can receive 302 a request from the customer. The request can be a certificate signing request (CSR) or similar request for a type of certificate or verification. The certificate authority can then generate 304 a request token (e.g., key, credential, or password, etc.), which can be a random number, a character string associated with the customer or customer system, a character string associated with an application executing on the customer system and submitting the request, or another such string. The certificate authority can then transmit 306 the request token to the customer system, which can calculate a cryptographic hash that takes into account the request token and the contents of the CSR. For example, the customer can generate a keyed hash-based message authentication code (HMAC) with the CSR as the content. The code and/or request token can include other content as well, as may be provided by, or may relate to, the user, a user account, or the application executing in the user system and for which the certificate is being obtained, among other such options. This code can then be placed in a location specified by the CA. For example, the code can be placed in the domain name system (DNS) for the relevant domain name(s). The certificate authority also calculates 308 a cryptographic hash of the CSR using the request token. The CA can then analyze 310 the specified DNS to extract the hash from the DNS. The DNS hash can then be compared 312 with the cryptographic hash expected from the CA, and if it is determined 314 that the hashes match (i.e., have the same value) then the identity can be verified and the appropriate action taken 316, such as to issue a certificate or otherwise provide for a requested type or level of access. If the hashes do not match, or there is no such hash associated with the DNS, then the identity will not be verified, the request denied 318, and an error message returned or another such action taken.

Figure 4:
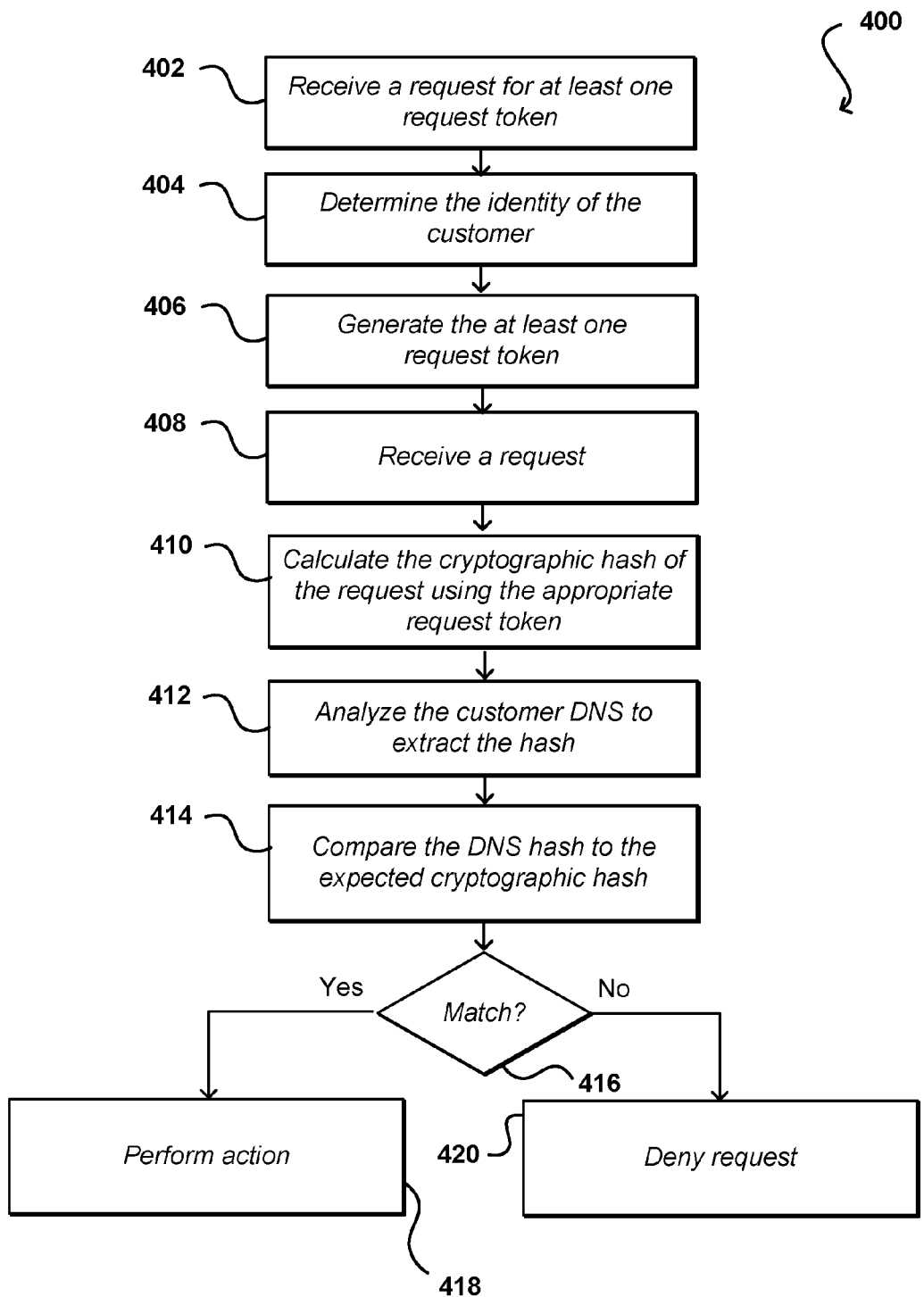
FIG. 4 illustrates a second example process for having an action performed in response to a request that can be utilized in accordance with various embodiments.

FIG. 4 illustrates another example process 400 for demonstrating authorization that can be utilized in accordance with various embodiments. In this example, a request is received 402 from a customer system to a certificate authority or other such service provider, where that request is a request for at least one request token. In this example, the initial request does not include any detail as to the particular use or need (i.e., to verify authorization for a domain), or the application requesting the authorization. In one example, the request can be a certificate signing request that does not specify a domain for the certificate. In such an example, the CA can determine 404 the identity of the customer associated with the request, and generate at least one request token 406 using a process such as that discussed above with respect to FIG. 3. In this example, however, the request token will not relate to an application or other such information, but will be a randomly generated string, string based on user information, or other such string. The customer can then hold onto the request token(s) until such time as an action is to be taken, such as issuance of a certificate. In this way, a customer can request a number of request tokens up front, and then generate the appropriate requests (i.e., CSRs) as needed. When an action is subsequently needed for the customer system, the customer can generate a CSR which includes the request token. The certificate authority can receive 408 the CSR from the customer environment. At around the time that the CSR is sent to the CA, the customer system (or a related system or service) can calculate the cryptographic hash of the CSR using the request token (or a selected one of the provided request tokens) and place the hash or resulting code in DNS as discussed previously. The CA can calculate 410 the cryptographic hash of the CSR using the appropriate request token. The CA can then analyze 412 the specified customer DNS to extract the hash from the DNS. The DNS hash can then be compared 414 with the cryptographic hash expected from the CA, and if it is determined 416 that the hashes match (i.e., have the same value) then the identity can be verified and an appropriate action taken 418. If the hashes do not match, or there is no such hash associated with the DNS, then the identity will not be verified, the request denied 420, and an error message returned or another such action taken.

An advantage to this process relative to the process of FIG. 3 is that a customer can purchase or otherwise obtain a number of tokens in batches. The customer can receive a string or token, such as a random number, that will serve as a request token for the certificates. As mentioned, in some embodiments multiple tokens might be provided, which might also specify an order of use or other such information. The customer can then have the request tokens available when needed, which can help reduce latency when issuance of a certificate or another such action is subsequently requested. The customer can also have the ability to pay for the actions or certificates at the time of requesting the actions or requesting the request tokens. The ability to pay for the actions at the time of requesting the request tokens can also help to reduce latency, but can be further advantageous to customers who might want to provide these request tokens to various users associated with the customer, etc. Each request token or token received could then be redeemable for an action in at least some embodiments.

Figure 5:
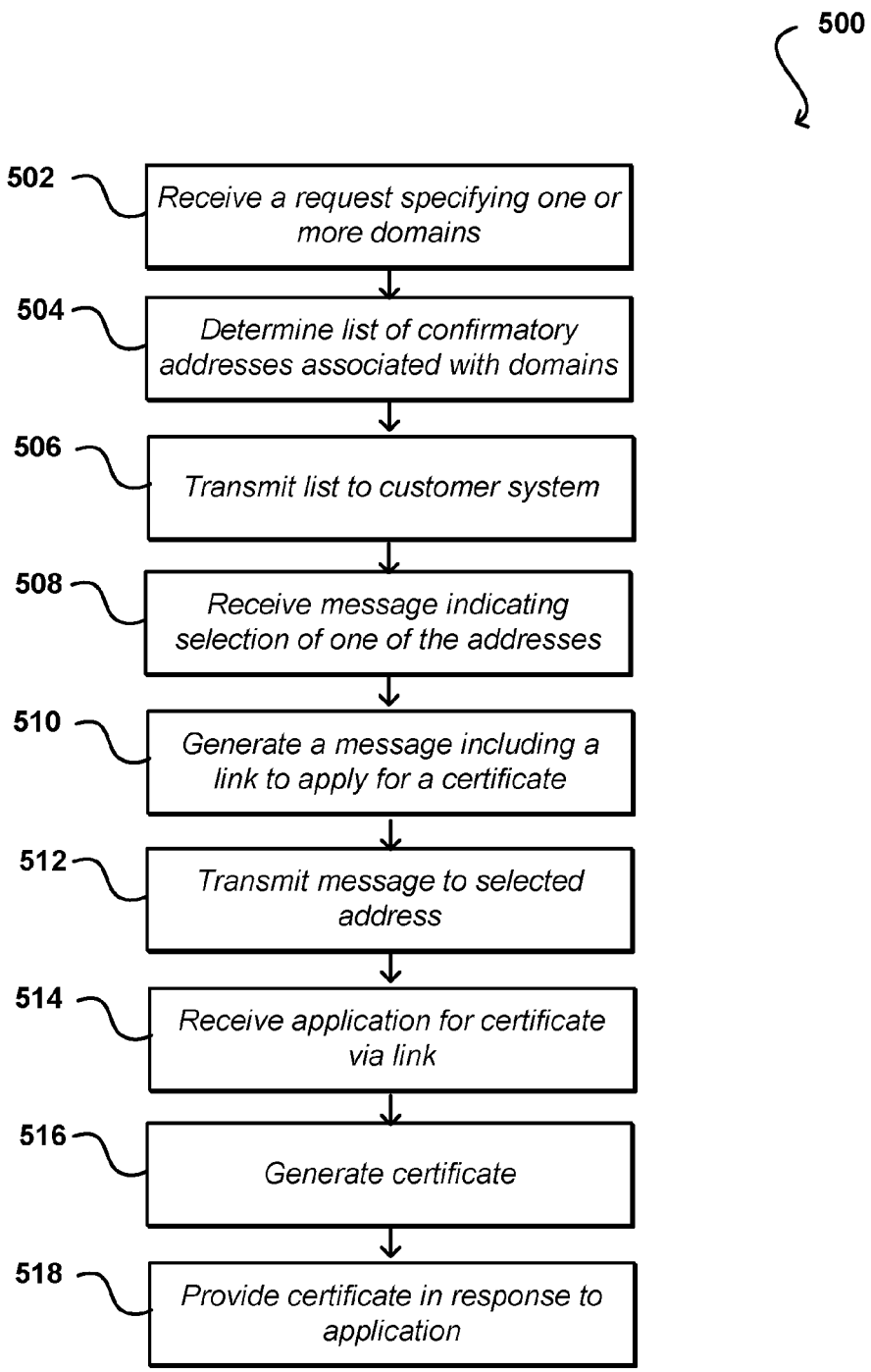
FIG. 5 illustrates a third example process for having an action performed in response to a request that can be utilized in accordance with various embodiments.

FIG. 5 illustrates another example process 500 for demonstrating authorization that can be utilized in accordance with various embodiments. In this example, a request is received 502 to a certificate authority, or other such service provider, that specifies one or more domain names for which authorization verification is desired. The CA can determine 504 a list of email addresses that can be used to confirm control of the domain name(s). The list can then be transmitted 506 to the customer system. A subsequent message can be received 508 that indicates one of the email messages associated with a given domain name (i.e., bob@example.com for domain example.com). The CA can generate 510 a message including a link with which to apply for a certificate, and can transmit 512 the message to the selected address. An application for a certificate can then be received 514 using the link, whereby the CA can generate 516 the certificate and provide 518 the certificate to the requesting customer. Such an approach can be of particular use to a reseller, for example, where the reseller could indicate that they need a certificate for a particular domain and could provide an email message for the person or entity in control of the domain, which might be separate from the reseller, whereby the owner can select the link to acknowledge the request for the certificate. The message with a link for a certificate can be an implicit solicitation on the part of the reseller. Such an approach can also be of benefit to companies where a different department or person may be responsible for managing certificates than owning or managing domains, etc.

Figure 6:
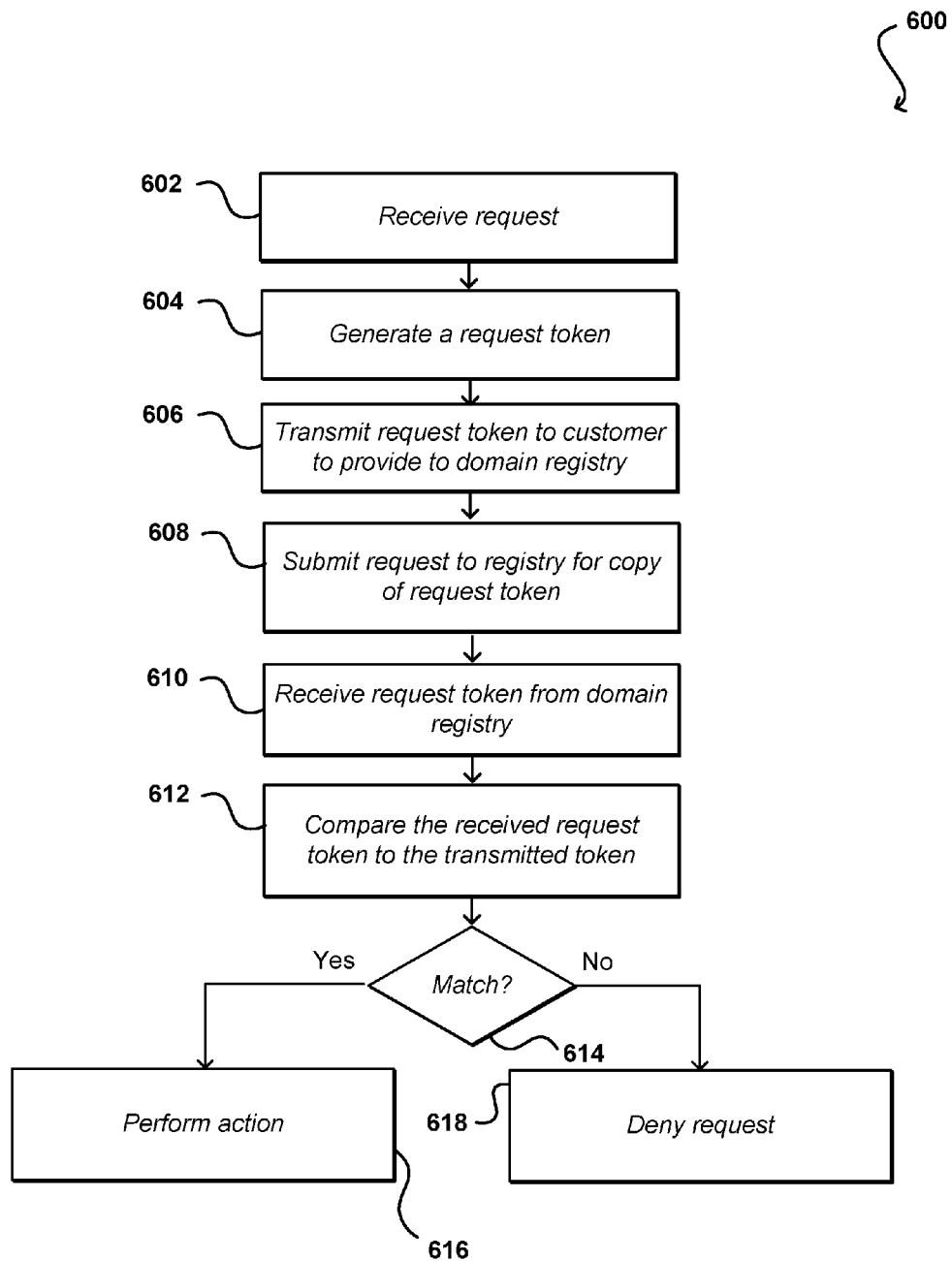
FIG. 6 illustrates a fourth example process for having an action performed in response to a request that can be used to implement aspects of various embodiments.

FIG. 6 illustrates another example process 600 for demonstrating authorization that can be utilized in accordance with various embodiments. This example requires the involvement of a third party, such as a domain registrar or registry that manages and/or tracks the ownership of various domain names. A request is received 602 to a certificate authority or other such service provider, where the request can be a request for an action, certificate, etc. In response, the certificate authority generates 604 a request token, such as a random number of other value discussed elsewhere herein, and transmits 606 that request token to the customer. The customer can provide that token to the appropriate domain registrar or registry, along with domain names that they approve. This can be part of the registration information for the user, which can be updated by the customer as appropriate. Meanwhile, the certificate authority can submit 608 a request to the registry specifying a domain name and requesting the request token issued to the customer, where the domain name should correspond to one of the domain names provided to the registry by the customer. A request token can then be received 610 to the certificate authority from the registry. The received request token can be compared 612 with the request token that is expected by the CA, and if it is determined 614 that the request tokens match (i.e., have the same value) then the identity can be verified and the appropriate action taken 616. If the tokens do not match, or no request token is received, then the identity will not be verified, the request denied 618, and an error message returned or another such action taken. This approach enables ownership and/or control of a domain name to be verified without requiring disclosure of personal or private information that might be required using conventional approaches, which can be desirable for customers who do not want that information publicly available through the registration data.

Figure 7:
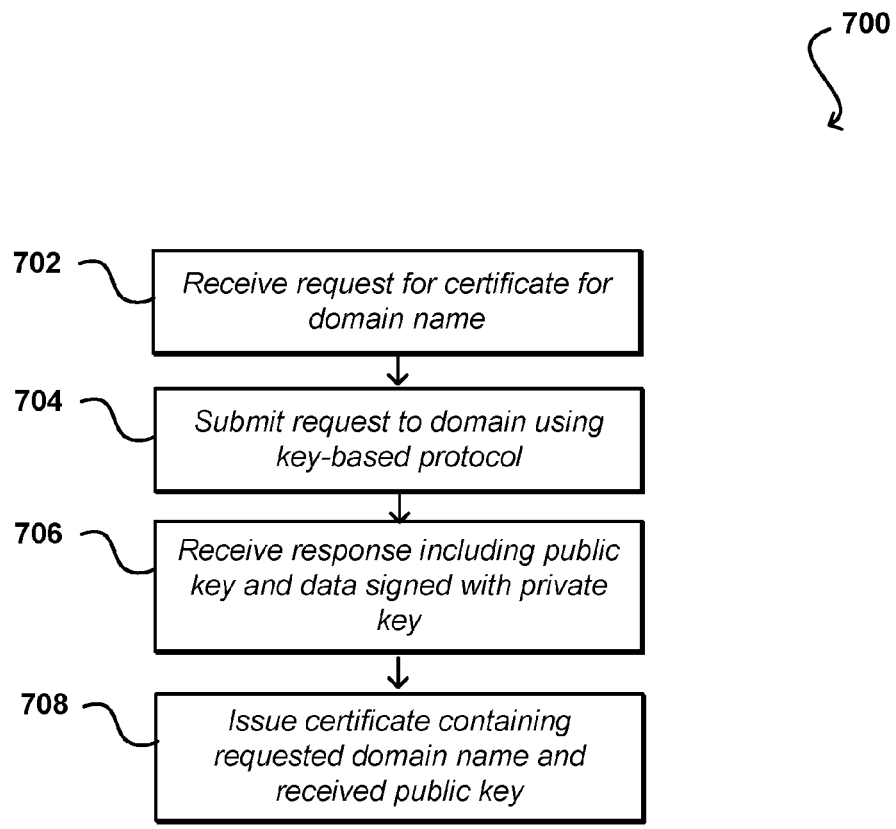
FIG. 7 illustrates a fifth example process for having an action performed in response to a request that can be used to implement aspects of various embodiments.

FIG. 7 illustrates another example process 700 for demonstrating authorization that can be utilized in accordance with various embodiments. In this example, a request is for a certificate for a domain name is received 702 from a customer. The CA can then submit 704 a request to the domain name using a determined protocol that uses public key cryptography. In response to the request, a response can be received 706 from the domain that includes a public key and data signed with the associated private key. This can be in the form of, for example, a self-signed certificate. The CA can then issue 708 a certificate containing the requested name and the received public key. This approach is different from those above at least for the fact that the CA checks what is currently on the domain and issues a certificate for that information. Such an approach provides advantages in efficiency, as instead of having to include the key in the request, a customer is able to request a certificate and provide the key by an active webserver or other such component to prove control over the webserver at the same time. Further, the certificate issued is only valid if the recipient has the matching private key. In this example, the certificate can include the public key for a domain, so it is only useful to a customer also having the private key for that domain. Such an approach avoids the extra validation of other approaches discussed herein as a person getting a certificate may not be authorized, but only authorized persons having the corresponding private key can utilize the certificate. The certificate could thus include (or in some embodiments be encrypted with) the public key for the domain and use of the certificate requires access to the corresponding private key. Such an approach also enables a web host or other third party to be able to request certificates that can be utilized by customers, or customers request certificates that can be used by authorized third parties having a copy of the private key, etc.

Figure 8:
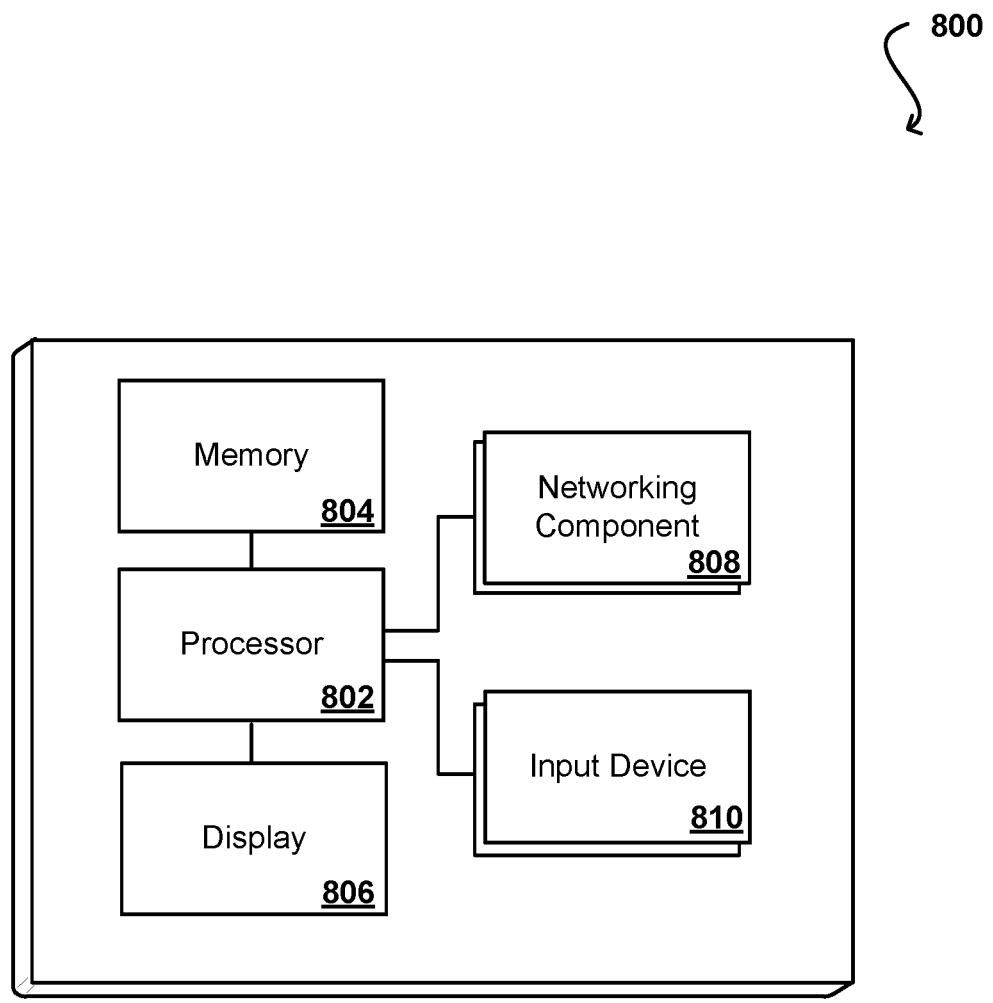
FIG. 8 illustrates example components of a computing device that can be used to implement aspects of various embodiments.

FIG. 8 illustrates a set of basic components of an example computing device 800 that can be utilized to implement aspects of the various embodiments. In this example, the device includes at least one processor 802 for executing instructions that can be stored in a memory device or element 804. As would be apparent to one of ordinary skill in the art, the device can include many types of memory, data storage or computer-readable media, such as a first data storage for program instructions for execution by the at least one processor 802, the same or separate storage can be used for images or data, a removable memory can be available for sharing information with other devices, and any number of communication approaches can be available for sharing with other devices. The device may include at least one type of display element 806, such as a touch screen, electronic ink (e-ink), organic light emitting diode (OLED) or liquid crystal display (LCD), although devices such as servers might convey information via other means, such as through a system of lights and data transmissions. The device typically will include one or more networking components 808, such as a port, network interface card, or wireless transceiver that enables communication over at least one network. The device can include at least one input device 810 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
  receiving, by a certificate authority, a request for a certificate for a domain name;
  generating, utilizing a public key cryptography protocol, a request for information regarding the domain name;

submitting, by the certificate authority, the request for information to a domain service hosting the domain name;

receiving, from the domain service, a response including a public key and including data for the domain name, with the data encrypted under an associated private key for the domain name; and issuing, by the certificate authority, a certificate specifying the domain name and encrypted with the received public key, the certificate unable to be validated without access to the associated private key.

2. The computer-implemented method of claim 1, further comprising:

causing the certificate to be self-signed on behalf of a user.

3. The computer-implemented method of claim 1, further comprising:

providing the public key via an active server for the domain name, wherein control over the active server is verified concurrently with providing the public key.

4. The computer-implemented method of claim 1, wherein the request for the certificate is a certificate signing request.

5. The computer-implemented method of claim 4, wherein the certificate signing request specifies information about an application configured to cause a task to be performed with respect to the domain, and further comprising:

generating a request key using information about the application.

6. The computer-implemented method of claim 1, further comprising:

receiving a plurality of requests, wherein at least a subset of the plurality of requests is received from a third party user associated with a customer.

7. The computer-implemented method of claim 1, wherein the domain name is a fully-qualified domain name (FQDN).

8. A computing system, comprising:

at least one processor; and memory having stored therein a set of instructions, which when performed by the at least one processor, cause the computing system to:

receive, by a certificate authority, a request for a certificate for a domain name;

utilize public key cryptography protocol, generate a request for information regarding the domain name;

submit, by the certificate authority, the request for information to a domain service hosting the domain name;

receive, from the domain service, a response including a public key and including data for the domain name, with the data encrypted under an associated private key for the domain name; and issue, by the certificate authority, a certificate specifying the domain name and encrypted with the received public key, the certificate unable to be validated without access to the associated private key.

9. The computer system of claim 8, wherein the response comprises a self-signed certificate.

10. The computer system of claim 8, wherein the domain name is a fully-qualified domain name (FQDN).

11. The computer system of claim 8, further comprising provision of the public key via an active server for the domain name, and wherein control over the active server is verified concurrently with providing the public key.

12. The computer system of claim 8, wherein the request for the certificate is a certificate signing request.

13. A non-transitory computing device-readable medium comprising computing device-executable instructions, wherein the instructions, in response to execution by a computing device, cause the computing device to:

receive, by a certificate authority, a request for a certificate for a domain name;

utilize public key cryptography protocol, generate a request for information regarding the domain name;

submit, by the certificate authority, the request for information to a domain service hosting the domain name;

receive, from the domain service, a response including a public key and including data for the domain name, with the data encrypted under an associated private key for the domain name; and issue, by the certificate authority, a certificate specifying the domain name and encrypted with the received public key, the certificate unable to be validated without access to the associated private key.

14. The non-transitory computing device-readable medium of claim 13, wherein the response comprises a self-signed certificate.

15. The non-transitory computing device-readable medium of claim 13, further comprising provision of the public key via an active server for the domain name, and wherein control over the active server is verified concurrently with providing the public key.

16. The non-transitory computing device-readable medium of claim 13, wherein the request for the certificate is a certificate signing request.

17. The non-transitory computing device-readable medium of claim 13, wherein the domain name is a fully-qualified domain name (FQDN).

* * * * *